Aug. 13, 1935.  M. J. BOUXIN  2,011,238
VEHICLE BRAKE TESTER
Filed June 7, 1933
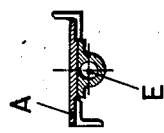
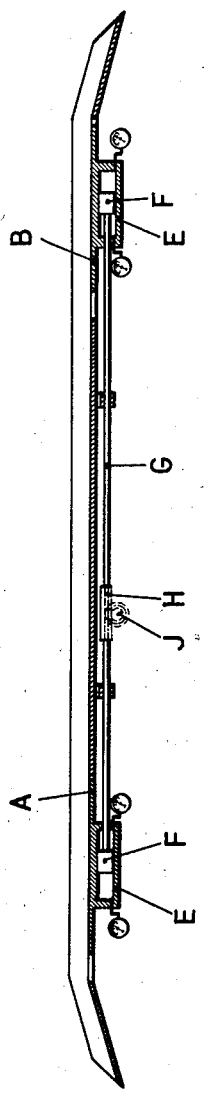
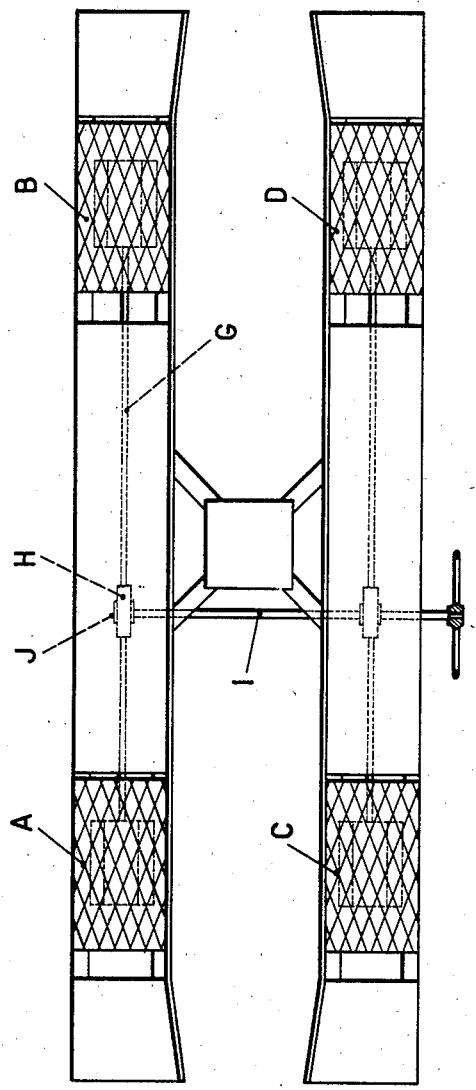

Patented Aug. 13, 1935

2,011,238

UNITED STATES PATENT OFFICE 2,011,238

VEHICLE BRAKE TESTER

Maurice Jules Bouxin, Moulins, France

Application June 7, 1933, Serial No. 674,741
In France June 13, 1932

1 Claim. (Cl. 265—47)

The existing apparatuses for verifying automobile brakes at present in existence offer two serious drawbacks: 1. Their high cost price, 2. the difficulty of making adjustments while checking.

The hoist brake-meter suppresses these drawbacks by its simplicity and due to the fact that it is fitted on the hoist. The tests are carried out when the road wheels of the car are raised to man's height which is the most convenient position for working; moreover adjustment can be made both for reverse and forward motion.

Hoist tracks are generally made up of two angle irons connected by thick sheet metal.

The tracks of the petitioner's apparatus comprise four movable units, A, B, C, D capable of sliding along the angle irons with a travel of about four inches; sliding takes place on trued faces on the angle irons or on rollers.

A cylinder E filled with oil is fixed under each of the movable units; leak proof piston F moving in this cylinder divides it into two cavities filled with oil. A flexible pipe connecting the corresponding cavity to a pressure gauge is fixed to each end of the cylinder. Under each individual track the two pistons are connected by a common rigid rod G one part of which has been cut in the form of a rack H. Said rod is guided under the fixed sheet metal portion of the side member.

A control shaft I is provided with two pinions J each engaging with the corresponding rack.

A motor car being positioned on the hoist with its four wheels resting on the movable units, the hoist is raised to a convenient height for working. The car is made fast rigidly to the fixed frame of the tracks by its rear and its front axles.

The movable units are brought to the end of their travel in the direction in which it is desired to verify the braking. The brakes are applied and the control lever which causes the movement of the pistons is actuated.

In each cylinder the piston compresses oil in the cavity towards which it is moving and thus transmits its thrust to the movable unit. The effort varies for a given car according to the resistance braking causes on the road wheel. The pressure of the compressed oil registered by the gauge is proportional to said effort and thus indicates the relative value of the braking effect. According to the pressure shown by each gauge the brakes will be regulated until perfect adjustment is obtained.

The gauges may, with advantage, be provided with an index mark showing the maximum position of the pointer.

Adjustment having been made for one running direction it is sufficient to rotate the lever in the opposite direction to check said adjustment in the other running direction.

What I claim is:

An apparatus of the type described comprising, in combination: runways, movable units sliding along said runways, oil cylinders each of which is positioned on each of said movable units, pistons movable in said cylinders, means for measuring the pressure of the oil compressed by said pistons in said cylinders, means for actuating said pistons comprising a rigid element connecting two adjoining pistons and positioned beneath the same runway, a rack portion upon said rigid element, a shaft and a pinion upon each end of said shaft co-operating with said rack portions.

MAURICE JULES BOUXIN.